Patented Dec. 4, 1923.

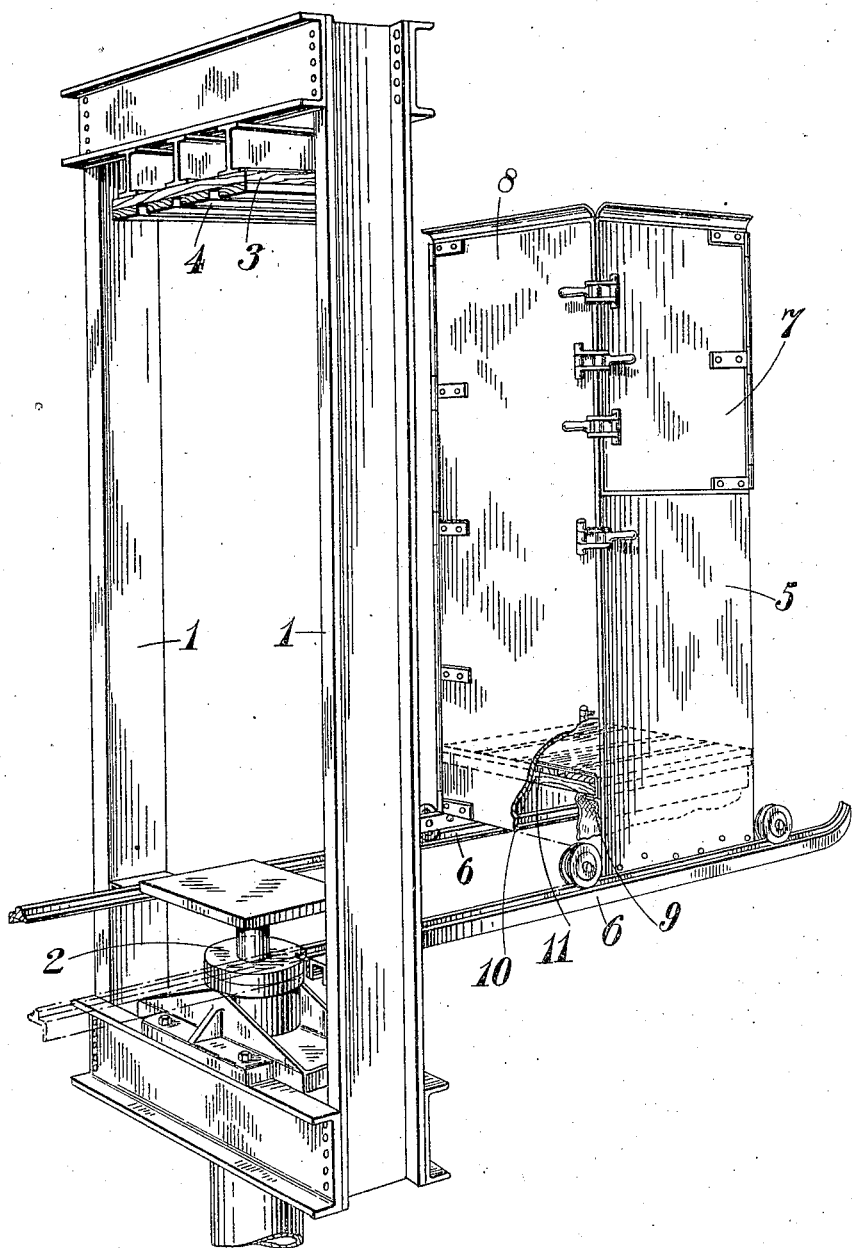

1,476,531

UNITED STATES PATENT OFFICE.

ALFRED WILLIAM MacILWAINE, OF NORTH FERRIBY, ENGLAND.

PRESERVATION AND PREPARATION FOR TRANSPORTATION OF OIL-BEARING RAW MATERIAL.

Application filed May 20, 1922. Serial No. 562,561.

*To all whom it may concern:*

Be it known that I, ALFRED WILLIAM MAC-ILWAINE, a subject of the King of England, residing at North Ferriby, East Riding of Yorkshire, England, have invented certain new and useful Improvements in the Preservation and Preparation for Transportation of Oil-Bearing Raw Material, of which the following is a specification.

This invention is for improvements in or relating to the preservation and preparation for transportation of oil-bearing raw material such as nuts, seeds and copra.

According to the present invention oil-yielding raw material, such as nuts, seeds or copra, is prepared for transport and/or preserved from decomposition by compressing quantities of said material in bulk, under a pressure insufficient to express any appreciable quantity of the contained oil, but sufficient to form a package of greatly reduced bulk. It is an important feature of the present invention that the pressures employed for compacting the masses of oil-bearing material shall not be sufficient to bring about any substantial expression of oil into the spaces between the particles.

In the preferred method of carrying the invention into effect, the compression pressure is such that none of the contained oil is expressed, while the material is formed into a coherent block.

According to one feature of the invention as applied to the treatment of nuts or seeds, the nuts or seeds are compressed while within their shells or casings.

The materials which may be treated according to the present invention include rubber nuts, walnuts, cohune nuts and the like, which are preferably compressed with their shells upon them. When the nuts have hard shells these will of course be broken more or less in compression but access of the atmosphere to the contents of the nuts is restricted in any case by reason of the fact that the spaces between the nuts are reduced by the compression, and in certain cases are also restricted by the presence of the shells. Thus, in an inexpensive manner the packing space occupied by a given quantity of nuts is reduced and yet the breakage of the nuts does not expose their kernels unduly, so that the valuable oil-bearing contents of the package are preserved.

By rubber nuts are meant the nuts produced by *Hevea braziliensis*, the most extensively grown of the rubber-yielding trees, the nuts of which yield a valuable oil which is, however, subject to decomposition on exposure to the air. The suitable preservation during transport of these nuts is therefore a matter of importance.

The invention may also be advantageously applied to the preservation and packing of all oil-bearing seeds, such for example, as kapok seed, the compression-pressure employed being such that no appreciable quantity of the oil content is expressed from the seed. The compression restricts access of the atmosphere to the seeds and the contained oil and preserves the oil accordingly. By compressing the seeds, accompanied by corresponding exclusion of air, the risk of spontaneous combustion and fire is also considerably lessened.

A further application of the invention lies in the preservation and transport of copra, the dried "meat" of the cocoanut, yielding copra oil. Here again compression of the material into blocks without expressing any of the contained oil leads to its preservation and reduces the cost of transport.

The invention includes a block or package of oil-yielding raw material of the type herein specified, prepared in the manner above set forth.

One preferred method of carrying this invention into effect will now be described in detail by way of example, reference being made to the accompanying drawing which is a diagram in perspective of one suitable form of press.

The press comprises an upright framework 1 with a hydraulic plunger 2 movable vertically from the bottom upward. At the top of the press frame is a horizontal headplate 3, with transverse wooden slats 4. The compression chamber comprises an upright box 5 movable on rails 6 which run through the press. The box has two fixed sides, rigidly secured at right angles. The lower half of a third side is also rigidly secured, but the upper half 7 is hinged. The fourth vertical wall 8 is hinged to the other fixed side. The top of the box is open, but at the bottom the side walls have inturned flanges 9 on which can be placed a wooden false bottom 10 with transverse wooden slats 11 above it.

In operation, laths (not shown) are first laid on the false bottom transversely to the slats 11, then a sheet of jute or like material is spread over the false bottom and the sides of the sheet hang down. The false bottom 10 is placed in position at the bottom of the box 5, which is then closed and the box is filled with the oil-bearing material to be compressed. Another sheet of jute or like material (not shown) is then placed over the top, and laths are laid on this top sheet transversely to the direction of the upper slats 4. The box is then run on the rails into the press, so that the false bottom comes just over the plunger, while the open top comes just under the slats of the head-plate. The plunger 2 is now gently raised (say half-way up the box), the pressure applied being in the region of one to two hundred-weights per square inch on the block. While pressure is still maintained, the hinged wall 8 and the hinged half-wall 7 are opened out so as to leave the block exposed on two sides. The whole box 5 is then wheeled away, still leaving the block under pressure between the plunger and head-plate. The sheets of jute or like material are folded round the block, and they are subsequently sewn up. Wires, cords, or hooping are passed round the package between the slats and made fast. The plunger is then lowered and the package removed. The resultant packages are rectangular in shape, and may thus be stowed for transport and shipment without waste of space.

It will be understood that the actual compression-pressure employed depends upon the quality and nature of the oil-yielding material to be treated, and no single value of pressure can be given as applicable alike to all oil-yielding material. Provided, however, the pressure is within the limits herein defined, the objects of the invention will be achieved.

I claim:—

1. A method of preserving oil-bearing raw material and preparing it for transport which consists in compressing quantities of said material in bulk under a pressure insufficient to express any appreciable quantity of the contained oil but sufficient to form a package of greatly reduced bulk.

2. A method of preserving oil-bearing raw material and preparing it for transport which consists in compressing quantities of said material in bulk under a pressure insufficient to express any of the contained oil but sufficient to form the material into a coherent block.

3. A method of preserving oil-bearing raw material and preparing it for transport which consists in compressing quantities of said material in bulk under a pressure insufficient to express any appreciable quantity of the contained oil but sufficient to reduce, to a great extent, the bulk of the material, and enclosing the compressed material in a packing of jute-like material.

4. A method of preserving oil-bearing raw material and preparing it for transport which consists in compressing quantities of said material in bulk under a pressure insufficient to express any appreciable quantity of the contained oil but sufficient to form a coherent block, enclosing said block in a packing of jute-like material, and thereafter passing binding elements round the outside of said packing.

5. A method of preserving copra and preparing it for transport which consists in compressing quantities of said copra in bulk under a pressure insufficient to express any appreciable quantity of the contained oil but sufficient to form a package of greatly reduced bulk.

6. A method of preserving copra and preparing it for transport which consists in compressing quantities of said copra in bulk under a pressure insufficient to express any of the contained oil but sufficient to form the copra into a coherent block.

7. As a new product, a coherent block of oil-bearing raw material of the type specified, substantially free from oil on its exterior and substantially free from interstitial air spaces.

8. As a new product, a coherent block of copra, substantially free from oil on its exterior and substantially free from interstitial air spaces.

In testimony whereof I affix my signature.

ALFRED WILLIAM MacILWAINE.